United States Patent [19]
Kreft

[11] Patent Number: 5,984,181
[45] Date of Patent: Nov. 16, 1999

[54] PROCESS AND DEVICE FOR DISPENSING INDIVIDUAL CHIP CARDS

[75] Inventor: Hans-Diedrich Kreft, Dassendorf, Germany

[73] Assignee: Angewandte Digital Electronik GmbH, Dassendorf, Germany

[21] Appl. No.: 08/952,706
[22] PCT Filed: May 18, 1996
[86] PCT No.: PCT/DE96/00870
§ 371 Date: Nov. 18, 1997
§ 102(e) Date: Nov. 18, 1997
[87] PCT Pub. No.: WO96/36936
PCT Pub. Date: Nov. 21, 1996

[30] Foreign Application Priority Data

May 18, 1995 [DE] Germany ............... 195 17 818

[51] Int. Cl.⁶ .................................. G06K 17/00
[52] U.S. Cl. ................ 235/380; 235/492; 902/26
[58] Field of Search ................ 235/379, 380, 235/492, 487; 902/26

[56] References Cited

U.S. PATENT DOCUMENTS

| | | | |
|---|---|---|---|
| 4,747,706 | 5/1988 | Duea .................................. | 400/70 |
| 4,884,212 | 11/1989 | Stutsman ....................... | 364/479.07 |
| 4,937,438 | 6/1990 | Warwick et al. ................ | 235/449 |
| 4,968,873 | 11/1990 | Dethloff et al. ................ | 235/380 |
| 5,146,067 | 9/1992 | Sloan et al. .................... | 235/381 |
| 5,206,489 | 4/1993 | Warwick ......................... | 235/449 |
| 5,266,781 | 11/1993 | Warwick et al. ................ | 235/375 |
| 5,440,108 | 8/1995 | Tran et al. ...................... | 235/381 |
| 5,637,845 | 6/1997 | Kolls ............................... | 235/381 |
| 5,814,796 | 9/1998 | Benson et al. .................. | 235/375 |

FOREIGN PATENT DOCUMENTS

| | | |
|---|---|---|
| 0266926 | 5/1988 | European Pat. Off. . |
| 0428233 | 11/1990 | European Pat. Off. . |
| WO 93/04433 | 3/1993 | WIPO . |
| WO 94/15306 | 7/1994 | WIPO . |

*Primary Examiner*—Donald Hajec
*Assistant Examiner*—Drew A. Dunn
*Attorney, Agent, or Firm*—Horst M. Kasper

[57] ABSTRACT

A process for dispensing individual chip cards to a plurality of individual chip card users employs a chip card dispensing station (1) with at least one storage container (2). Chip cards are stored in the chip card dispensing station (1). The chip cards are capable for use in external read-write stations and contain electronic components requested by a card user for implementing chip card applications. A remotely located verification or monitoring station (5) is linked to the chip card dispensing station (1) via a cable-linked and/or radio-linked active data connection (4) for entering personal data into the chip card dispensing station via a user menu (3). A loaded chip card is issued to the card user operating the user menu. The loaded chip card is selected from the chip cards stored the chip card dispensing station (1).

18 Claims, 2 Drawing Sheets

PROCESS AND DEVICE FOR DISPENSING INDIVIDUAL CHIP CARDS

BACKGROUND OF THE INVENTION

1. Field of the Invention

The invention relates to a process and to a device for dispensing individual chip cards to a plurality of individual chip card users, employing a chip card dispensing station with at least one storage container.

2. Brief Description of the Background of the Invention Including Prior Art.

EP 0,428,233 A1 discloses a process and a device for dispensing chip cards on which information can be electromagnetically stored and is readable; moreover, visual information is present that serves to identify the bearer of the card. The electromagnetically readable information and the visual information are arranged on different layers of the chip card which are arranged in a completely enclosed sheathing. A device for the production of such chip cards comprises a central processing unit, a video camera connected to it as well as a distributor machine that is likewise connected to the processing unit. The distributor machine comprises a printer in order to print a picture that has been taken by the video camera onto a suitable carrier, whereby the picture is converted into electric signals by the processing unit, as well as a magazine in which a large number of electromagnetically programmable carriers are arranged. The distributor machine also comprises an apparatus to apply a transparent sheathing layer around the carrier and the picture carrier layer that contains the picture so as to join the carrier and the picture carrier layer to each other in this manner.

DE 30 44 463 C2 discloses a process and a device for individually coding cards, each of which bears its individually assigned card code, for example, a serial number, in readable form, by means of which and using a person-specific secret code, the PIN, an output offset code is formed according to defined algorithms, and this code is recorded on the card in readable form. The PIN code is individually specified by the person and encoded with a person-specific open code, e.g. an account number, according to a defined first algorithm, in order to generate an initial offset code that is encoded with an institution-specific secret code in order to generate an auxiliary offset code. The auxiliary offset code is encoded according to a third algorithm with the information card code read off the card in order to generate the output offset code.

DE 93 10 231.3 U1 describes an information system for tourism with a display system having a data processing unit with a memory, monitor, numeric keyboard, function keys, picture fields with a plan and overview as well as an arrangement of various system components in an information carrier as well as a modem and/or interface that establishes a data connection with printout options.

WO 93/04433 describes a standardized modular card dispensing system in which modules are mechanically and electrically connected to each other in order to form a device for dispensing specific, personalized cards. For this purpose, a controller is connected to a communication bus with an input keyboard and a monitor, making it possible for the controller to acquire and forward personalizing data from various card production modules, in order to produce differently coded, personalized cards in this manner. These are always chip cards of one and the same chip card provider.

SUMMARY OF THE INVENTION

1. Purposes of the Invention

It is an object of the present invention to provide a process for dispensing individual chip cards to a plurality of individual chip card users employing a chip card dispensing station and a remotely located verification or monitoring station.

It is a further object of the present invention to provide a device for dispensing individual chip cards to a plurality of individual chip card users having a chip card dispensing station and a remotely located verification or monitoring station.

These and other objects and advantages of the present invention will become evident from the description which follows.

2. Brief Description of the Invention

A first step of a process for dispensing individual chip cards to a plurality of individual chip card users can be employing a chip card dispensing station with at least one storage container and then storing chip cards in the chip card dispensing station. The chip cards are capable for use in external read-write stations and contain electronic components requested by a card user for implementing chip card applications.

The next step of the process can be employing a remotely located verification or monitoring station and connecting the chip card dispensing station via a cable-linked and/or radio-linked active data connection to the remotely located verification or monitoring station and entering personal data into the chip card dispensing station via a user menu.

After that can follow transmitting the personal data to the remotely located verification or monitoring station whereby programs and/or data of the chip card dispensing station can be changed by back-transmitted data and/or programs from the remotely located verification or monitoring station and loading at least one of the chip cards with programs and/or data as a function of programs and/or data coming from the remotely located verification or monitoring station.

A last of the process step can be issuing a loaded chip card to the card user operating the user menu and selected from the chip card dispensing station.

A device for dispensing individual chip cards to a plurality of individual chip card users can be provided with a chip card dispensing station having at least one storage container for storing chip cards. The chip cards contain electronic components with functions requested by card users for implementing chip card applications. The chip cards are capable for use in external read/write stations.

The device can be provided with a remotely located verification or monitoring station.

A cable-linked and/or radio-linked active data connection can link the chip card dispensing station and the remotely located verification or monitoring station for purposes of loading the chip cards with data via a user menu by a card user able to enter individual, person-specific or person-related particulars into the chip card dispensing station.

A card printing station can have an optical/electronic recording unit and pictures taken by the optical/electronic recording unit can be applied onto a card surface by means of the card printing station.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
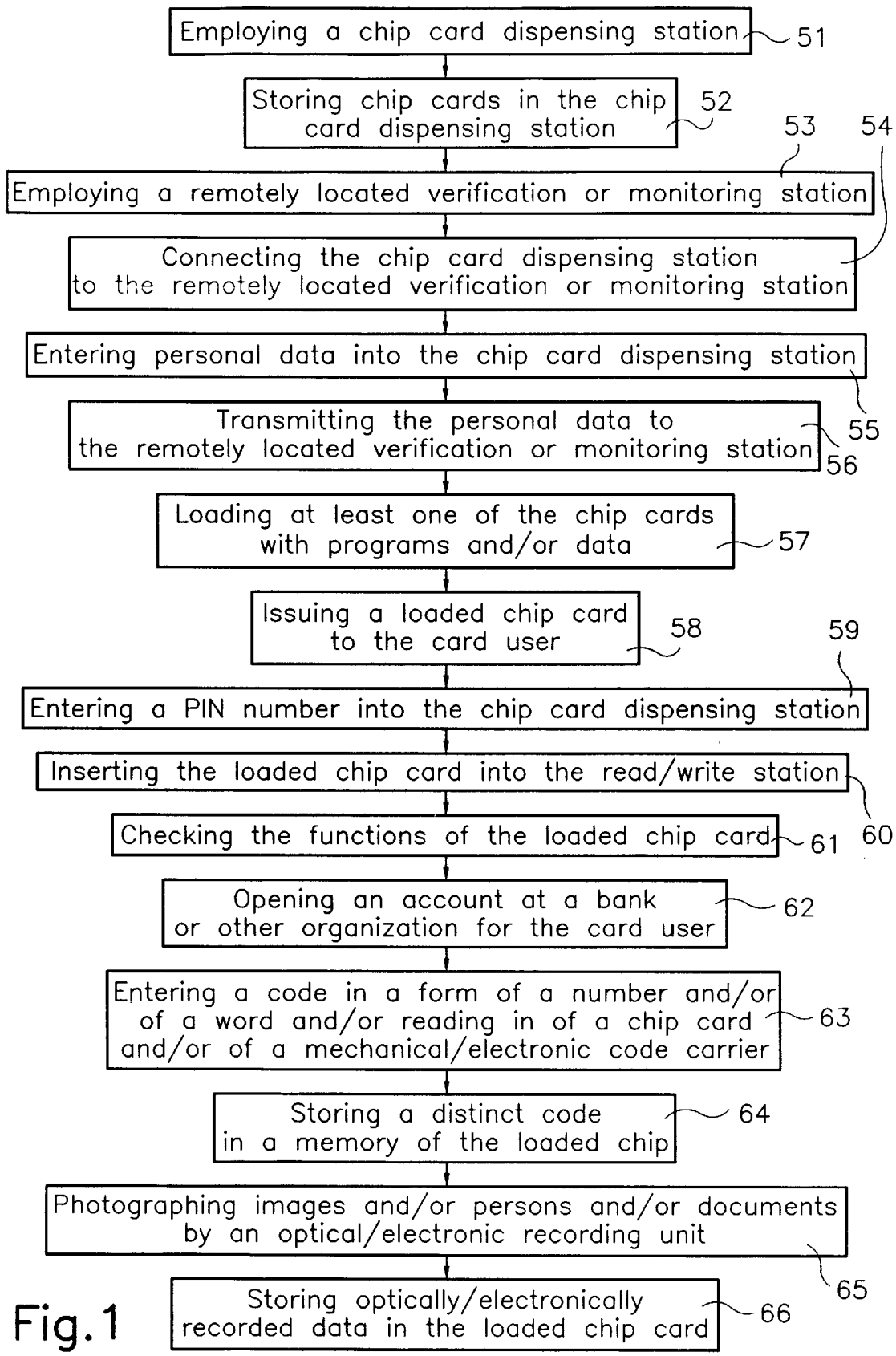
FIG. 1 is a flow chart of a process for dispensing individual chip cards.
Figure 2:
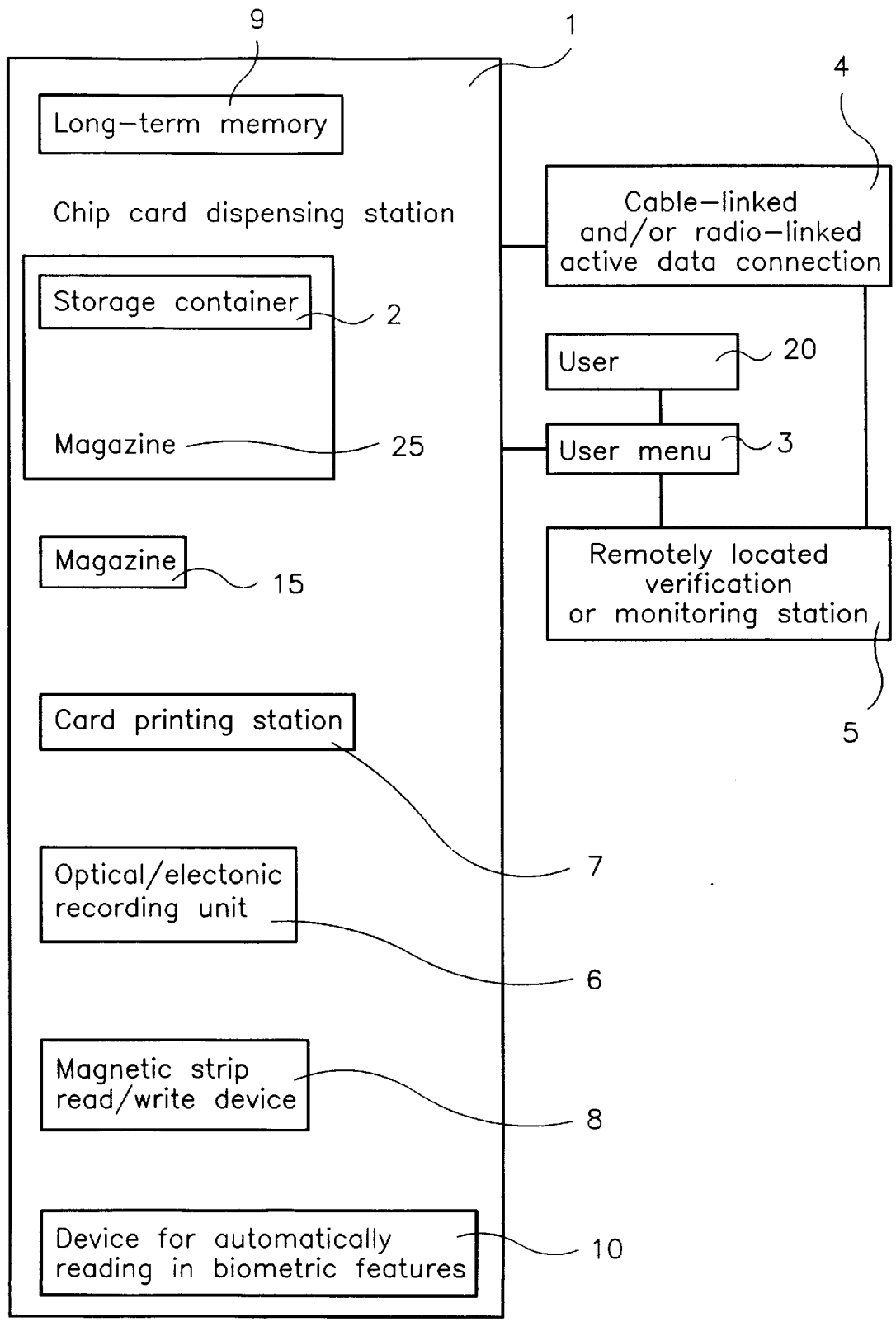
FIG. 2 is a device for dispensing individual chip cards shown schematically.

The present invention providers for a process for dispensing individual chip cards to a plurality of individual chip card users which is shown schematically in FIG. 1 and contains following steps: employing a chip card dispensing station 51, storing chip cards in the chip card dispensing station 52, employing a remotely located verification or monitoring station 53, connecting the chip card dispensing station to the remotely located verification or monitoring station 54, entering personal data into the chip card dispensing station 55, transmitting the personal data to the remotely located verification or monitoring station 56, loading at least one of the chip cards with programs and/or data 57, issuing a loaded chip card to the card user 58, entering a PIN number into the chip card dispensing station 59, inserting the loaded chip card into the read/write station 60, checking the functions of the loaded chip card 61, opening an account at a bank or other organization for the card user 62, entering a code in a form of a number and/or of a word and/or reading in of a chip card and/or of a mechanical/electronic code carrier 63, storing a distinct code in a memory of the loaded chip 64, photographing images and/or persons and/or documents by an optical/electronic recording unit 65, storing optically/electronically recorded data in the loaded chip card 66. FIG. 2 shows a device for dispensing individual chip cards shown schematically.

The invention is based on the objective of allowing the automated dispensing of individual chip cards to an initially unknown card user for a plurality of chip card providers or service providers according to individual requirements of a card user in a simple and efficient manner.

DISCLOSURE OF THE INVENTION AND OF ITS ADVANTAGES

This objective is achieved according to the invention in that a connection is established via a cable-linked and/or radio-linked active data connection to a remotely located verification or monitoring station of various card providers that is either automatic or human-operated, and the personal data is transmitted to the remote verification or monitoring station of the selected card provider, whereby the programs and/or data of the chip card dispensing station can be changed by back-transmitted data and/or programs from the selected remote verification or monitoring station and the chip card is loaded with programs and/or data as a function of the programs and/or data coming from the remote verification or monitoring station, so that the card user operating the menu receives his individual chip card for use, issued by the card provider he has selected from the chip card dispensing station.

Whereas up until now, chip cards have been issued by banks, credit card organizations or companies directly to a known chip card user, the invention advantageously makes it possible to issue chip cards to an initially unknown card user, whereby, at a chip card dispensing station, the unknown card user can obtain an overview of various card providers, card properties and their advantages. Subsequently, the right card can be selected from among various providers and, following a procedure of card initialization and card personalization, a card for a specific purpose and/or the card of a specific card provider can be dispensed from a card storage unit.

Three times are distinguished. Before the point in time t1, there are cards in the magazine of a chip card dispensing station for a plurality of card users. During the time period Dt, which lies between t1 and the later time t2, a specific card is selected and prepared for a specific user, whereby said card can be used at a time after t2 in conventional card terminals.

Chip cards are stored in a magazine as the storage container of the chip card dispensing station at a point in time t1. At the point in time t1, the chip cards contain those electronic components whose functions are requested before the point in time t1 by many undefined and unknown card users for implementing chip card applications. This ensures that the chip card dispensing station contains chip cards of the type normally required on the market.

Loading the chip card with data and dispensing the chip card to card users take place via the user menu. Communication takes place between the menu and the card user in such a way that the user menu presents the sequence of the process of loading and dispensing the card unambiguously and repeatably for all kinds of card users. The procedures in each menu sequence take place in a repeatable manner. In this way, according to the patent, it is ensured that the only steps taken by different users and by the chip card dispensing station are those steps that are permitted on the menu.

During the time Dt, the chip card dispensing station is connected via a cable-linked and/or radio-linked active data connection to a remotely located verification or monitoring station that is either automatic or human-operated. The card user has to be checked in order for chip cards to be dispensed. In particular, the identity of a card user has to be verified, since it has to be ruled out that a card user initializes a card with the particulars of another card user. If the sequence of the unambiguously specified specifications of the user menu can be influenced by means of programs in the chip card dispensing station and if, during the time Dt, the programs and data of the chip card dispensing station can be loaded and/or changed and/or selected via the data connection, then the sequence of the procedures at the chip card dispensing station can be influenced by information from the remote station. In this manner, according to the invention, it is ensured that the output of cards to card users at a chip card dispensing station is controlled by an organization that is responsible for the cards and their properties; personal contact between an employee of an organization that issues chip cards and a card user is replaced by communication via a data connection.

During the time Dt, the card user can enter individual, person-specific data known only to him or person-related particulars into the chip card dispensing station by means of the user menu via the data line. During the time Dt, this data is transmitted from the chip card dispensing station to the remote station and it can be verified there. As a function of this transferred data, the programs and/or data of the chip card dispensing station can be changed by back-transmitted data and/or programs from the remote station. Thus, an individual setting of the menu sequence is possible from the remote station. For example, the sequence can be changed as a function of the age of the card user. In this manner, the loading of the chip card with programs and/or data is also made possible as a function of the programs and/or data arriving from the remote station. Consequently, chip cards can be loaded with the data that the card user requests via the menu or that the remote station would like to load into the cards.

One reason for making use of the chip card dispensing station is the initialization, i.e. the first-time functional activation of a chip card. For example, a specific numerical code has to be entered into the chip card so that it will accept data for the first time. This ensures that chip cards can only be activated by those remote sites that have the code for opening them, i.e. for their functional activation. According to the invention, this is done by means of programs and/or data from the remote station. Another reason is the personalization of the chip card, i.e. the first-time loading of the chip card with programs and/or data, which are uniquely associated with the card user of the chip card and which identify him as an entitled card user of the chip card.

With this process, the selection of a specific chip card from the magazine takes place in that the card user operating the menu receives his individual, distinct chip card at point in time t2. This chip card corresponds to his information entered via the menu so that, at a point in time after t2, the chip card can be used in the manner he intended. At the same time, a remotely located verification site will be able to check the proper issuing of the card and store data pertaining to the issued card for control purposes.

Advantageously, the chip card dispensing station is equipped with an optical/electronic recording unit for photographing images and/or persons and/or documents. The recorded pictures can be transmitted to the remote station. This ensures that a card user at the chip card dispensing station can also be recognized remotely, for example, by means of a video installation. Personal identification documents or other papers and written information can also be transmitted by the recording unit. The act of signing can also be transmitted. The authentication, i.e. the entitlement of the right person to receive a card, can be ensured in this manner.

The chip card dispensing station is also equipped with a card printing station so that the surface of the card can be printed on in order to create different appearances. For example, pictures of the user taken by video can be applied onto the card surface by means of the card printing station. In this way, the surface of the card can be given a distinct appearance. By the same token, the chip card dispensing station can store the optically/electronically recorded data in the chip card. In this manner, particulars of the person such as, for instance, the picture of the user, can be entered into the memory of a chip card.

For this purpose, the chip card dispensing station is equipped with an alphanumeric keypad for entering numbers and/or letters and/or any other characters. Thus, the entry of a secret number (PIN) into the card is ensured during the card personalization. The card user knows which number has to be entered if specific functions of the chip card are to be accessed. The process is comparable to that used with today's magnetic strip cards.

According to the invention, the chip card dispensing station has a read/write station for chip cards, which functions in the same manner as the conventional chip card terminals found on the market. In this way, it is possible to check the function of a chip card dispensed by the chip card dispensing station via a request to this effect by the user menu in the read/write station after the point in time t2. In case of an error, for example, the card can be invalidated.

The chip card inserted into the read/write station can also be checked by the remotely located monitoring system. The further utilization of the chip card can be made contingent upon the back-transmitted data from the remote station.

The chip card dispensing station can contain a built-in printer that generates a confirmation slip on the transactions made by the chip card user. This makes it possible to print out the data stored in the chip card dispensing station or alternatively, to print out the data of the card and its stored contents. Thus, the card user receives a record of the transactions made and of the card's stored contents.

The chip card dispensing station also has a long-term memory and consequently, it can store all of the actions and data utilized for a later review.

In addition, the chip card dispensing station has a magnetic strip read/write device. In this way, cards with magnetic strips can also be dispensed by the chip card dispensing station. The procedures can take place in the same way as described above for chip cards. The only difference is that, in addition to the chip in the card, there is also a magnetic strip in the known form. Consequently, chip cards with magnetic strips can also be dispensed at the chip card dispensing station. Unwritten magnetic strips can also be written by the magnetic strip write device.

The chip card dispensing station can have several magazines, separated from each other, in which different cards are present, depending on the technical configuration and on the card issuers; the card user can select a card to suit his requirements. For example, a contact-free card can be selected that can be specially offered by a provider for applications in the sector of public transportation.

Via the menu, an account at a bank or other organization can be opened for the card user via the remotely located station. With newly issued chip cards, this is often the objective of the organization offering the cards. The advantage of the process lies in the fact that the card user can examine the various cards and the services they offer at one or several chip card dispensing stations during the time t without having to get into contact with a specific card provider. The competition among the card providers takes place in the neutral environment of the chip card dispensing station.

The cards of the chip card dispensing station can contain specific pre-initializations which are present in the card in the form of data. This entails special advantages for the card user with certain service providers when he uses a certain card. For example, limit amounts or travel points for local public transportation can already be present in the card so that the card can be used quickly and conveniently.

For purposes of personal advice, the chip card dispensing station can be connected to an operator via a phone connection. In personal communication between the card user and the operator, questions can be discussed that facilitate the proper preparation of a card for the card user.

The chip card dispensing station can contain a device for automatically reading in biometric features. This ensures that a card user can identify himself, for example, by reading in his fingerprint.

The chip card dispensing station can automatically establish a connection with various remotely located stations, depending on the selection of a specific card from the magazine. This ensures that the organization responsible for the specifically selected card can influence the menu sequence.

In order to be activated, the chip card dispensing station requires the entry of a code in the form of a number and/or of a word and/or the reading in of a chip card and/or of a mechanical/electronic code carrier. In the chip card dispensing station, this code can be compared (decoded) to a code present there by means of an algorithmic procedure and, only after the codes match (after decoding), the functions of the chip card dispensing station can be activated. This serves to rule out unauthorized use of the station.

The chip card dispensing station can have a distinct code stored in it that can be transferred into the memory of the cards to be initialized. Thus, the cards containing the code can be clearly identified as belonging to the specific chip card dispensing station.

The invention is commercially applicable for dispensing chip cards of various chip card providers to card users. The usefulness of the invention lies especially in the fact that the chip cards are present in a non-predetermined manner without association with a specific chip card provider and without association with a specific chip card application, and subsequently, these cards can be issued by the card user in a completely individualized manner for himself or for a certain other person, whereby the card user can anonymously select the chip card provider.

It will be understood that each of the elements described above, or two or more together, may also find a useful application in other types of a process and a device for dispensing individual chip cards differing from the types described above.

While the invention has been illustrated and described as embodied in the context of a process for dispensing individual chip cards and a device for dispensing individual chip cards provided with a chip card dispensing station and a remotely located verification or monitoring station, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A process for dispensing individual chip cards to a plurality of individual chip card users comprising following steps:
   employing a chip card dispensing station with at least one storage container;
   storing chip cards in the chip card dispensing station wherein the chip cards are capable for use in external read-write stations and contain electronic components requested by a card user for implementing chip card applications;
   employing a remotely located verification or monitoring station;
   connecting the chip card dispensing station via a cable-linked and/or radio-linked active data connection to the remotely located verification or monitoring station;
   entering personal data into the chin card dispensing station via a user menu;
   transmitting the personal data to the remotely located verification or monitoring station whereby programs and/or data of the chip card dispensing station can be changed by back-transmitted data and/or programs from the remotely located verification or monitoring station;
   loading at least one of the chip cards with programs and/or data as a function of programs and/or data coming from the remotely located verification or monitoring station;
   issuing a loaded chip card to the card user operating the user menu and selected from the chip card dispensing station.

2. The process according to claim 1, wherein a first-time functional activation of the loaded chip card is determined inside the chip card dispensing station by programs and/or data from the remotely located verification or monitoring station.

3. The process according to claim 1, wherein in order to personalize the loaded chip card, the loaded chip card is loaded for the first time with programs and/or data, which are uniquely associated with the card user and which identify the card user as an entitled user of the loaded chip card.

4. The process according to claim 3, wherein in order to personalize the loaded chip card, a PIN number is entered via the user menu into the chip card dispensing station as a secret number and stored in the loaded chip card.

5. The process according to claim 1, wherein the chip card dispensing station has a read/write station for chip cards and the user menu asks the card user to insert the loaded chip card into the read/write station for purposes of checking the functions of the loaded chip card.

6. The process according to claim 5, wherein the loaded chip card inserted into the read/write station is checked by the remotely located verification or monitoring station, whereby further utilization of the loaded chip card is contingent upon the back-transmitted data from the remote verification or monitoring station.

7. The process according to claim 1, wherein the chip card dispensing station has several magazines, separated from each other, whereby different cards are present in each magazine, depending on technical card configuration and on different card issuers, and the chip card dispensing station automatically establishes a connection with various remotely located stations, depending on selection of a specific card from a selected magazine.

8. The process according to claim 1, wherein the chip cards of the chip card dispensing station contain specific pre-initializations in a form of data, which entails special advantages with certain service providers for the card user when the card user uses the loaded chip card.

9. The process according to claim 1, wherein the chip card dispensing station contains a printer that generates a confirmation slip on transactions made by the card user, whereby data stored in the chip card dispensing station as well as data of the loaded chip card and stored contents are printed out.

10. The process according to claim 1, wherein the chip card dispensing station has a long-term memory and all of actions and data are available for a later review.

11. The process according to claim 1, wherein the chip card dispensing station has a magnetic strip read/write device for dispensing chip cards with magnetic strips.

12. The process according to claim 1, wherein via the user menu, an account at a bank or other organization is opened for the card user via the remotely located verification or monitoring station.

13. The process according to claim 1, wherein
the chip card dispensing station contains a device for automatically reading in biometric features of the card user.

14. The process according to claim 1, wherein
the chip card dispensing station requires an entry of a code in a form of a number and/or of a word and/or reading in of a chip card and/or of a mechanical/electronic code carrier, whereby a read-in code is compared to a code in the chip card dispensing station and, only after two codes match, functions of the chip card dispensing station are activated.

15. The process according to claim 1, wherein
the chip card dispensing station has a distinct code stored in it that is transferred into a memory of the loaded chip card, as a result of which the loaded chip card containing the code can be clearly identified as belonging to a specific chip card dispensing station.

16. The process according to claim 1, wherein
the chip card dispensing station is equipped with an optical/electronic recording unit for photographing images and/or persons and/or documents, whereby recorded pictures are transmitted to the remotely located verification or monitoring station and the chip card dispensing station stores optically/electronically recorded data in the loaded chip card.

17. A device for dispensing individual chip cards to a plurality of individual chip card users comprising a chip card dispensing station having at least one storage container for storing chip cards wherein the chip cards contain electronic components with functions requested by card users for implementing chip card applications and wherein the chip cards are capable for use in external read/write stations;

a remotely located verification or monitoring station; a cable-linked and/or radio-linked active data connection linking the chin card dispensing station and the remotely located verification or monitoring station for purposes of loading the chip cards with data via a user menu by a card user able to enter individual, person-specific or person-related particulars into the chip card dispensing station; and a card printing station having an optical/electronic recording unit, whereby pictures taken by the optical/electronic recording unit can be applied onto a card surface by means of the card printing station.

18. The device, according to claim 17, wherein
the chip card dispensing station is connected to an operator via a phone connection, and personal communication between the card user and the operator is possible.

* * * * *